United States Patent [19]
Parker et al.

[11] Patent Number: 5,456,044
[45] Date of Patent: Oct. 10, 1995

[54] TOMATO POT

[76] Inventors: Johnny M. Parker; Vivian M. Parker, both of P.O. Box 499, Edmondson, Ark. 72332

[21] Appl. No.: 337,088

[22] Filed: Nov. 10, 1994

[51] Int. Cl.$^6$ .................................................. A01G 17/00
[52] U.S. Cl. .................................. 47/27; 47/25; 47/48.5
[58] Field of Search ........................... 47/27 C, 25, 25 R, 47/48.5 G

[56] References Cited

U.S. PATENT DOCUMENTS

| | | | |
|---|---|---|---|
| 2,435,539 | 2/1948 | Gould | 47/27 C |
| 3,803,759 | 4/1974 | Heinecke | 47/27 C |
| 3,816,959 | 6/1974 | Nalle | 47/27 C |
| 3,896,586 | 7/1975 | Caldwell | 47/27 C |
| 4,268,992 | 5/1981 | Scharf | 47/27 C |
| 4,348,831 | 9/1982 | Chambers | 47/27 C |

FOREIGN PATENT DOCUMENTS

| | | | |
|---|---|---|---|
| 1226735 | 9/1987 | Canada | 47/27 C |
| 2570925 | 4/1986 | France | 47/27 C |

Primary Examiner—Henry E. Raduazo

[57] ABSTRACT

A tomato pot comprising a pot formed of a plastic material having a planar base in a circular configuration with an enlarged central hole extending therethrough and a small supplemental hole extending therethrough, a side wall in a frustro-conical configuration extending upwardly from the periphery of the base, the side wall extending upwardly to an elevation equal to between about 25 and 50 percent of the diameter of the base; an interior first cylindrical wall extending upwardly from the central hole; an interior second cylindrical wall extending upwardly from the supplemental hole with an intermediate annular projection extending radially inwardly to divide the cylindrical wall into a lower receiving area and an upper receiving area; a vertically extending pipe extending upwardly with its lower end secured in the upper receiving area of the second cylindrical member; and a downwardly extending short pipe coupled at its upper end to the lower receiving area of the second cylindrical wall and having an apertured pipe extending downwardly at an angle therefrom to a location beneath the first hole whereby when a tomato plant is planted in the ground through the first aperture, its roots will be located generally above the apertured member.

5 Claims, 4 Drawing Sheets

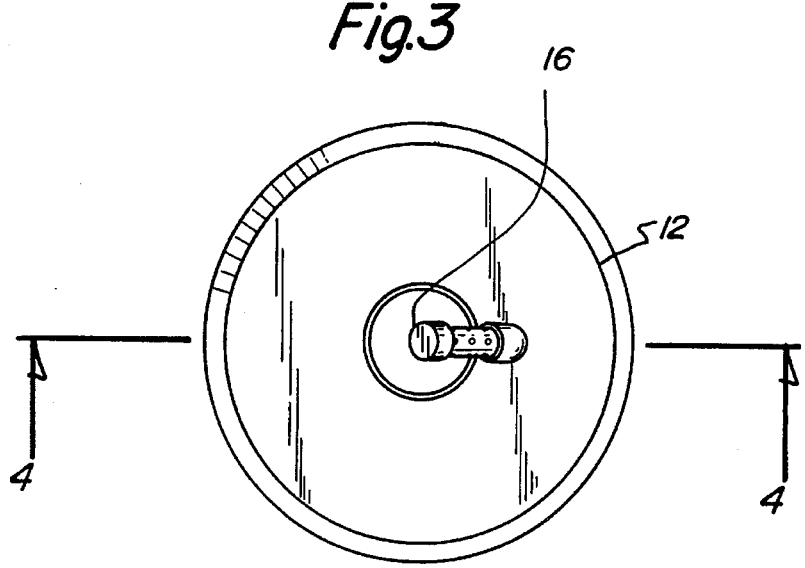
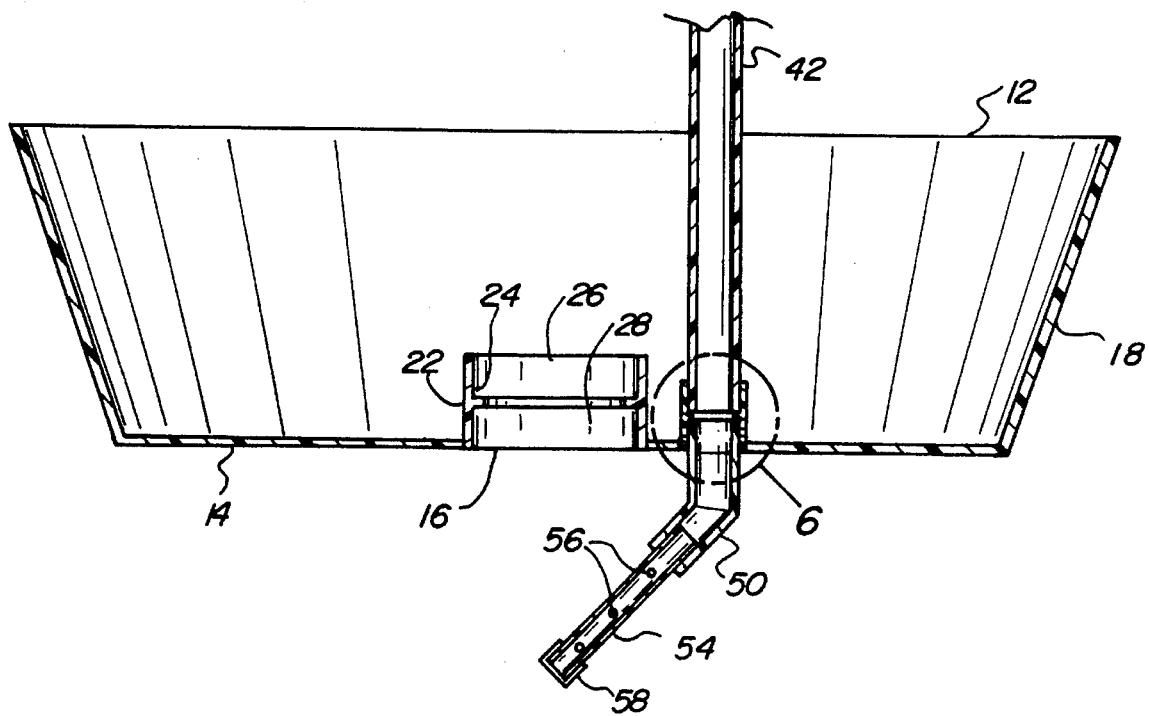

TOMATO POT

BACKGROUND OF THE INVENTION

1. Field of the Invention

The present invention relates to a new and improved tomato pot and, more particularly, pertains to watering tomato plants in a most efficient manner through a pot and associated water directing components.

2. Description of the Prior Art

The use of pots and watering devices of a wide variety of designs and configurations is known in the prior art. More specifically, pots and watering devices of a wide variety of designs and configurations heretofore devised and utilized for the purpose of caring for plants including their watering through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of pots and watering devices of a wide variety of designs and configurations. By way of example, U.S. Pat. No. 3,579,908 to Morgan discloses a support for growing plants.

U.S. Pat. No. 4,677,788 to Mastandrea discloses a support for tomato plants and the like.

U.S. Pat. No. 4,745,706 to Muza discloses a plant watering and feeding stake.

U.S. Pat. No. 4,870,781 to Jones discloses a combination tree support and feeder stake.

Lastly, U.S. Pat. No. 4,922,653 to Stone discloses a plant watering and feeding support system.

In this respect, the tomato pot according to the present invention substantially departs from the conventional concepts and designs of the prior art, and in doing so provides an apparatus primarily developed for the purpose of watering tomato plants in a most efficient manner through a pot and associated water directing components.

Therefore, it can be appreciated that there exists a continuing need for a new and improved tomato pot which can be used for watering tomato plants in a most efficient manner through a pot and associated water directing components. In this regard, the present invention substantially fulfills this need.

SUMMARY OF THE INVENTION

In view of the foregoing disadvantages inherent in the known types of pots and watering devices of a wide variety of designs and configurations now present in the prior art, the present invention provides a new and improved tomato pot. As such, the general purpose of the present invention, which will be described subsequently in greater detail, is to provide a new and improved tomato pot and methods which have all the advantages of the prior art and none of the disadvantages.

To attain this, the present invention essentially comprises a new and improved tomato pot comprising, in combination: a pot formed of a plastic material having a planar base in a circular configuration with an enlarged central hole extending therethrough and a small supplemental hole extending therethrough, a side wall in a frustro-conical configuration extending upwardly from the periphery of the base, the side wall extending upwardly to an elevation equal to between about 25 and 50 percent of the diameter of the base; an interior first cylindrical wall extending upwardly from the central hole with an intermediate annular projection extending radially inwardly to divide the cylindrical wall into a lower receptor and an upper receptor; an interior second cylindrical wall extending upwardly from the supplemental hole with an intermediate annular projection extending radially inwardly to divide the cylindrical wall into a lower receiving area and an upper receiving area, the height of the first cylindrical wall being less than half the height of the side wall and the height of the second cylindrical wall being less than the height of the first cylindrical wall; a vertically extending pipe assembly formed of a plurality of component pipes extending upwardly with its lower end secured in the upper receiving area of the second cylindrical member; and a downwardly extending short pipe coupled at its upper end to the lower receiving area of the second cylindrical wall and having an apertured pipe extending downwardly at an angle therefrom to a location beneath the first hole whereby when a tomato plant is planted in the ground through the first aperture, its roots will be located generally above the apertured member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tomato pot which has all the advantages of the prior art pots and watering devices of a wide variety of designs and configurations and none of the disadvantages.

It is another object of the present invention to provide a new and improved tomato pot which may be easily and efficiently manufactured and marketed.

It is a further object of the present invention to provide a new and improved tomato pot which is of a durable and reliable construction.

An even further object of the present invention is to provide a new and improved tomato pot which is susceptible of a low cost of manufacture with regard to both materials and labor, and which accordingly is then susceptible of low prices of sale to the consuming public, thereby making such a tomato pot economically available to the buying public.

Still yet another object of the present invention is to provide a new and improved tomato pot which provides in the apparatuses and methods of the prior art some of the advantages thereof, while simultaneously overcoming some of the disadvantages normally associated therewith.

Even still another object of the present invention is to water tomato plants in a most efficient manner through a pot and associated water directing components.

Lastly, it is an object of the present invention to provide a tomato pot comprising a pot formed of a plastic material having a planar base in a circular configuration with an enlarged central hole extending therethrough and a small supplemental hole extending therethrough, a side wall in a frustro-conical configuration extending upwardly from the periphery of the base, the side wall extending upwardly to an elevation equal to between about 25 and 50 percent of the diameter of the base; an interior first cylindrical wall extending upwardly from the central hole; an interior second cylindrical wall extending upwardly from the supplemental hole with an intermediate annular projection extending radially inwardly to divide the cylindrical wall into a lower receiving area and an upper receiving area; a vertically extending pipe extending upwardly with its lower end secured in the upper receiving area of the second cylindrical member; and a downwardly extending short pipe coupled at its upper end to the lower receiving area of the second cylindrical wall and having an apertured pipe extending downwardly at an angle therefrom to a location beneath the first hole whereby when a tomato plant is planted in the ground through the first aperture, its roots will be located generally above the apertured member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom elevational view of the pot shown in FIGS. 1 and 2 including the watering pipe.

FIG. 4 is a cross-sectional view of the pot taken along line 4—4 of FIG. 3.

The same reference numerals refer to the same parts throughout the various Figures.

DESCRIPTION OF THE PREFERRED EMBODIMENT

Figure 1:
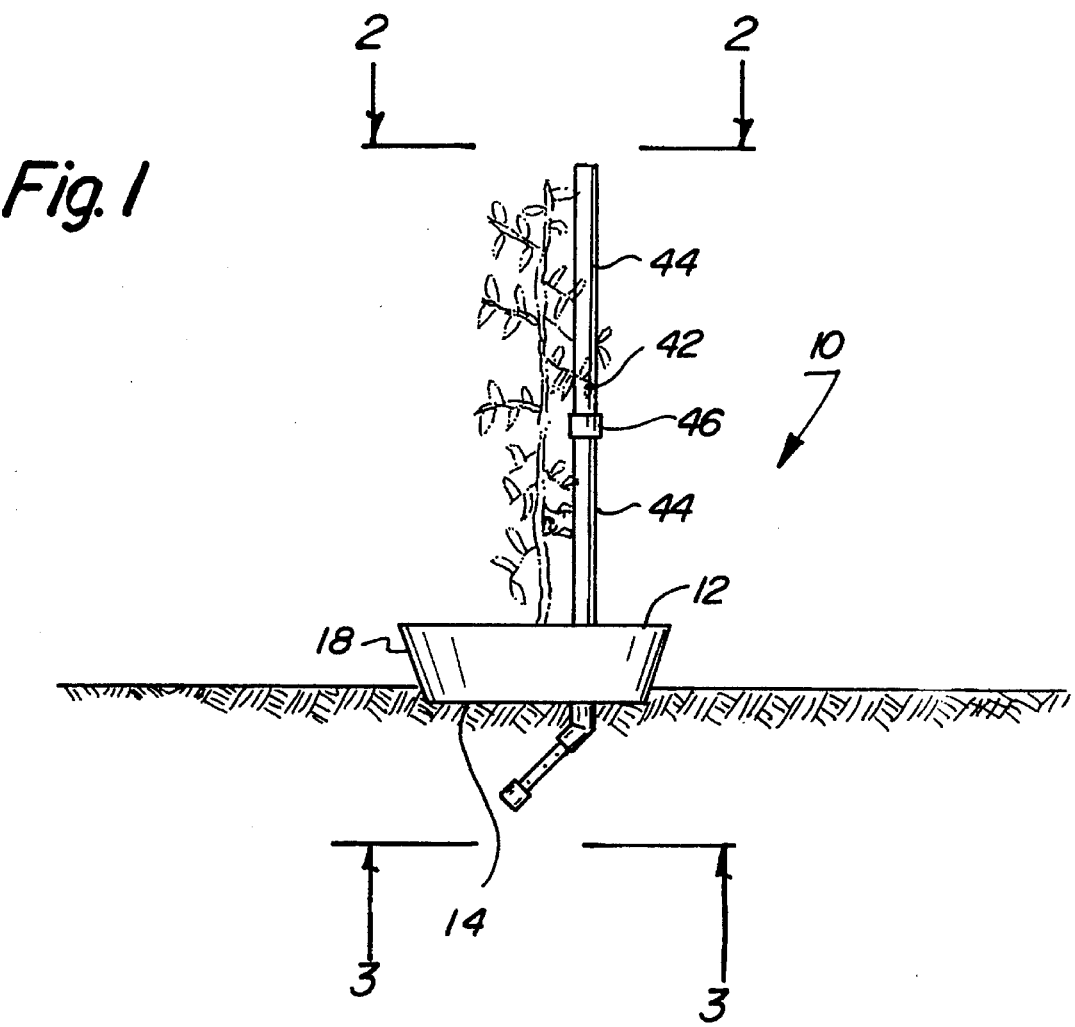
FIG. 1 is a front elevational view of the preferred embodiment of the new and improved tomato pot constructed in accordance with the principles of the present invention.
Figure 2:
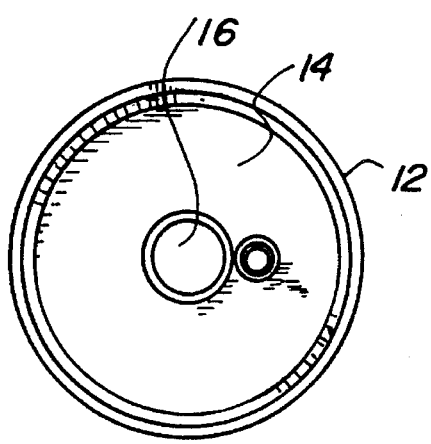
FIG. 2 is a top elevational view of the pot shown in FIG. 1.
Figure 5:
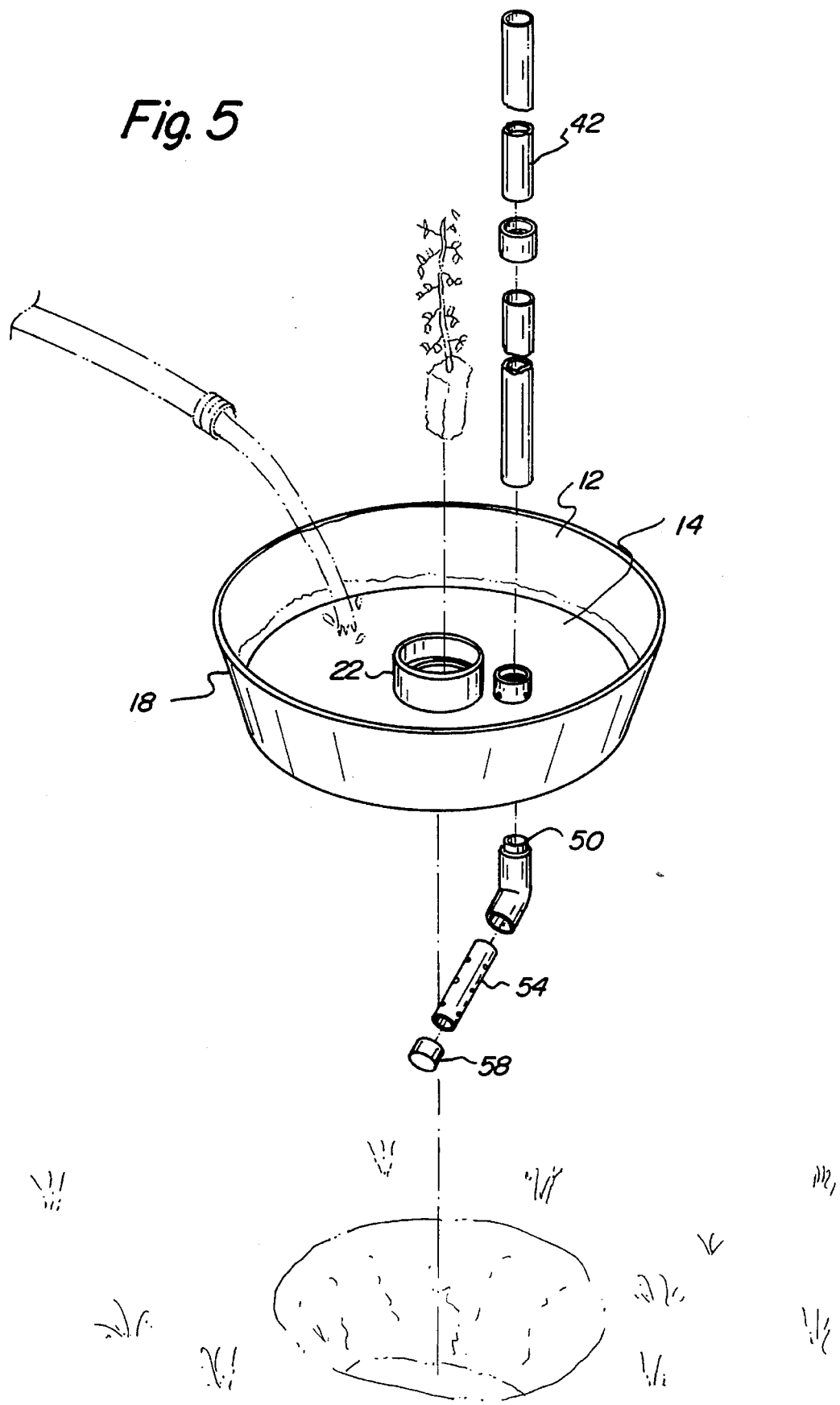
FIG. 5 is an exploded perspective view of the pot shown in the prior Figures including the associated components.
Figure 6:
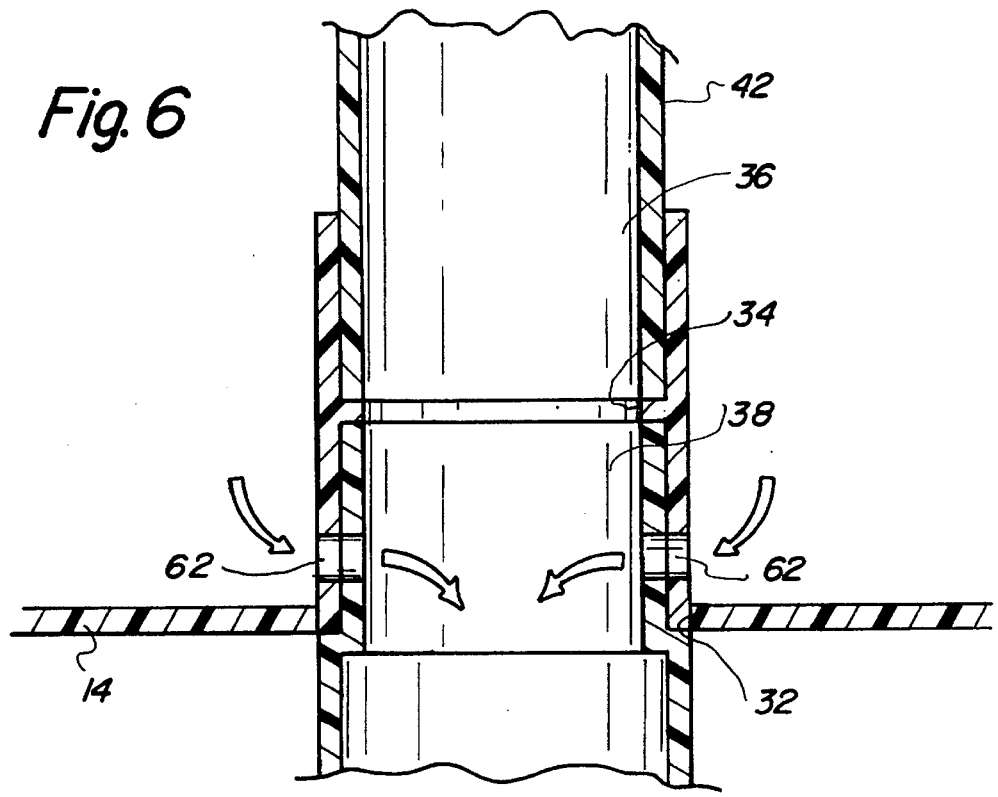
FIG. 6 is an enlarged cross-sectional view taken about circle 6 of FIG. 4.

With reference now to the drawings, and in particular to FIGS. 1 through 7 thereof, the preferred embodiment of the new and improved tomato pot embodying the principles and concepts of the present invention and generally designated by the reference numeral 10 will be described.

The present invention, the new and improved tomato pot is a system comprised of a plurality of components. The components in their broadest context include a pot, first cylindrical wall, second cylindrical wall, pipe assembly and short pipe. Each of the individual components is specifically configured and correlated one with respect to the other to attain the desired objectives.

More specifically, the system 10 has as its central component a pot 12. The pot is formed of a plastic material, preferably polyvinyl chloride (PVC), a preferred material for all the components of the system 10 of the present invention. The pot has a planar base 14 in a circular configuration. It is formed with an enlarged central hole 16 extending therethrough. It is also formed with a small supplemental hole 18 extending therethrough. A side wall 20 are formed in a frustro-conical configuration and extend upwardly from the periphery of the base. The side wall extends upwardly to an elevation equal to about 25 and 50 percent of the diameter of the base.

Next provided is an interior first cylindrical wall 24. Such wall extends upwardly from the central hole. It has an intermediate annular projection 26. Such projection extends radially inwardly to divide the cylindrical wall into a lower receptor 28 and an upper receptor 30.

In addition, a similarly configured interior second wall 34 extends upwardly from the supplemental hole 36. The second cylindrical wall has an intermediate annular projection 38. Such projection extends radially inwardly to divide the second cylindrical wall into a lower receiving area 40 and an upper receiving area 42. The height of the first cylindrical wall is preferably less than half the height of the side wall. Further, the height of the second wall is preferably less than the height of the first wall.

A vertically extending pipe assembly 46 is formed of a plurality of component pipes 48. Such component pipes are coupled through a sleeve 50. The pipe assembly extends upwardly with its lower end secured in the upper receiving area of the second cylindrical member. In addition, a downwardly extending short pipe 52 is provided. It is coupled at its upper end to the lower receiving area of the second cylindrical wall. Such short pipe has coupled thereto an apertured pipe 54. A bend in the short pipe allows the apertured pipe to extend downwardly at an angle therefrom to a location beneath the first hole. In this manner, when a tomato plant is planted in the ground through the first aperture, its roots will be located generally above the apertured member. An end cap 56 insures that the water is fed to the desired areas.

A final feature of the invention includes horizontal apertures 60 extending through the second cylindrical wall and the short pipe. This allows for the proper drainage of water from the pot downwardly through the short pipe and apertured pipe. Note FIG. 6.

Figure 7:
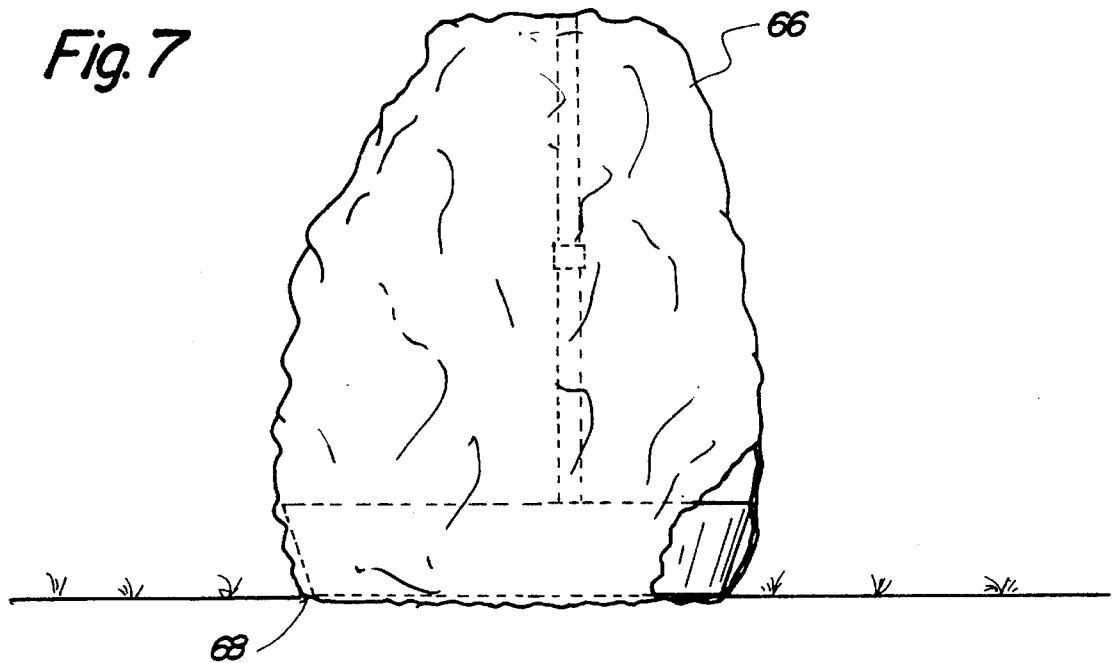
FIG. 7 is a front elevational view with parts broken away to illustrate an alternate embodiment of the invention.

A final feature of the invention is shown in FIG. 7, an alternate embodiment of the invention. In such embodiment, a plastic bag 64 is provided with an upper closed end and a lower open end. The plastic bag is positionable over the system 10 of the present invention and supported by the vertical tube assembly. The periphery of its lower opened end is tucked under the pot for securement purposes.

The present invention is a planter designed especially for plants, such as tomatoes, which demand regular watering and need to be supported while they are growing. It consists of a pot 10 inches in diameter, two 1-inch couplers, two 1-inch caps, one 4-inch PVC coupler, and one 6-inch length and one 36-inch length of PVC pipe, both 1-inch in diameter.

The 4-inch coupler is fastened around a 4-inch opening in the center of the pot. One of the small couplers is fastened next to the opening. A small 5/16-inch hole is drilled in the bottom area inside this coupler. The 36-inch piece of PVC pipe fits down in the coupler. The other coupler is fastened to the bottom of the pot directly underneath the first coupler, and the 6-inch length of PVC pipe is attached to it. A series of small 5/16-inch holes is also drilled along the length of the pipe. One of the caps is fastened to its open end.

The present invention is easy to use. After preparing the soil, dig a small hole in the ground and place the pot over it so that the hole is beneath the 4-inch opening the bottom of the pot. The length of PVC pipe under the pot will stick down into the ground. The plant can then be planted in the hole beneath the opening. Replace the soil in the hole, and add water to the pot. The water will seep out the small 5/16-inch hole and down into the 6-inch length of pipe. It will gradually seep out the holes in the pipe and into the ground, directly to the roots of the plant.

This unique design makes watering more efficient because the water goes directly where it is most beneficial. As the plant grows, it can be tied to the 36-inch length of pipe for support. The present invention also makes garden maintenance easier since grass cannot grow around the plant. Grass growing around the pot can be quickly and easily removed with a weed eater. It is also an effective deterrent against cutworms and other destructive insects.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved tomato pot comprising, in combination:

a pot formed of a plastic material having a planar base in a circular configuration with an enlarged central hole extending therethrough and a small supplemental hole extending therethrough, a side wall in a frustro-conical configuration extending upwardly from the periphery of the base, the side wall extending upwardly to an elevation equal to between about 25 and 50 percent of the diameter of the base;

an interior first cylindrical wall extending upwardly from the central hole with an intermediate annular projection extending radially inwardly to divide the cylindrical wall into a lower receptor and an upper receptor;

an interior second cylindrical wall extending upwardly from the supplemental hole with an intermediate annular projection extending radially inwardly to divide the cylindrical wall into a lower receiving area and an upper receiving area, the height of the first cylindrical wall being less than half the height of the side wall and the height of the second cylindrical wall being less than the height of the first cylindrical wall;

a vertically extending pipe assembly formed of a plurality of component pipes extending upwardly with its lower end secured in the upper receiving area of the second cylindrical member; and a downwardly extending short pipe coupled at its upper end to the lower receiving area of the second cylindrical wall and having an apertured pipe extending downwardly at an angle therefrom to a location beneath the first hole whereby when a tomato plant is planted in the ground through the first aperture, its roots will be located generally above the apertured member.

2. A tomato pot comprising:

a pot formed of a plastic material having a planar base in a circular configuration with an enlarged central hole extending therethrough and a small supplemental hole extending therethrough, a side wall in a frustro-conical configuration extending upwardly from the periphery of the base, the side wall extending upwardly to an elevation equal to between about 25 and 50 percent of the diameter of the base;

an interior first cylindrical wall extending upwardly from the central hole;

an interior second cylindrical wall extending upwardly from the supplemental hole with an intermediate annular projection extending radially inwardly to divide the cylindrical wall into a lower receiving area and an upper receiving area;

a vertically extending pipe extending upwardly with its lower end secured in the upper receiving area of the second cylindrical member; and a downwardly extending short pipe coupled at its upper end to the lower receiving area of the second cylindrical wall and having an apertured pipe extending downwardly at an angle therefrom to a location beneath the first hole whereby when a tomato plant is planted in the ground through the first aperture, its roots will be located generally above the apertured member.

3. The device as set forth in claim 2 and further including:

a plastic bag positionable over the upwardly extending pipe with its lower open end positioned beneath the periphery of the base.

4. The device as set forth in claim 2 wherein the height of the first cylindrical projection is less than half the height of the side wall and the height of the second cylindrical wall is less than the height of the first cylindrical wall.

5. The device as set forth in claim 2 and further including:

horizontal apertures extending through the second cylindrical wall and short pipe for the drainage of water.

* * * * *